(12) United States Patent
Vennet et al.

(10) Patent No.: US 10,843,219 B2
(45) Date of Patent: Nov. 24, 2020

(54) INSTALLATION FOR FABRICATING A THERMAL PROTECTION COVERING OF A BODY OR OF A REAR ASSEMBLY FOR A THRUSTER, AND ASSOCIATED METHODS

(71) Applicant: AIRBUS SAFRAN LAUNCHERS SAS, Issy-les-Moulineaux (FR)

(72) Inventors: Caroline Vennet, Le Bouscat (FR); Edouard Borie, Eysines (FR); Julien Rodolausse, Martignas sur Jalles (FR); Pierre Lassalle, Saint Medard en Jalles (FR); Matthieu Munoz, Saint Medard en Jalles (FR); Johan Boirie, Cestas (FR)

(73) Assignee: ARIANEGROUP SAS, Paris (FR)

( * ) Notice: Subject to any disclaimer, the term of this patent is extended or adjusted under 35 U.S.C. 154(b) by 511 days.

(21) Appl. No.: 15/337,763

(22) Filed: Oct. 28, 2016

(65) Prior Publication Data

US 2017/0120289 A1 May 4, 2017

(30) Foreign Application Priority Data

Oct. 30, 2015 (FR) ...................... 15 60406

(51) Int. Cl.
  *B05C 5/02* (2006.01)
  *B05D 1/26* (2006.01)
  (Continued)

(52) U.S. Cl.
  CPC ............ *B05C 5/0225* (2013.01); *B05D 1/002* (2013.01); *B05D 1/265* (2013.01); *B29C 53/8041* (2013.01); *B29C 53/66* (2013.01)

(58) Field of Classification Search
  CPC ... B29C 53/8041; B29C 53/66; B29C 53/665; B05C 5/0225; B05D 1/002; B05D 1/265
  See application file for complete search history.

(56) References Cited

U.S. PATENT DOCUMENTS 7,999,561 B2 * 8/2011 Uozumi ................ B29B 15/122
  324/658
2015/0360398 A1 * 12/2015 Monnereau ........... B29C 43/245
  264/40.7

FOREIGN PATENT DOCUMENTS

EP     2 060 383 A1    5/2009
WO  WO 2014/118340 A1  8/2014

OTHER PUBLICATIONS

Search Report as issued in French Patent Application No. 1560406, dated Jun. 24, 2016.

* cited by examiner

*Primary Examiner* — Seyed Masoud Malekzadeh
(74) *Attorney, Agent, or Firm* — Pillsbury Winthrop Shaw Pittman LLP

(57) ABSTRACT

An installation for fabricating a thermal protection covering of a body or of a rear assembly for a thruster, includes an extruder presenting a die having an outlet orifice through which a strip of elastomer material is to be extruded, the extruder having a die control system to vary the size of the outlet orifice; a mandrel to be set into rotation about its axis; a deposition head to deposit the strip on the mandrel; a conveyor system to convey the strip from the outlet orifice of the die of the deposition head; and a thickness monitoring system to measure the thickness of the strip on the deposition head and on the mandrel and to compare each measured thickness value with a predetermined value, the thickness monitoring system to control the die control system so as to cause the size of the outlet orifice of the die to vary.

6 Claims, 7 Drawing Sheets

(51) Int. Cl.
B29C 53/80 (2006.01)
B05D 1/00 (2006.01)
*B29C 53/66* (2006.01)

INSTALLATION FOR FABRICATING A THERMAL PROTECTION COVERING OF A BODY OR OF A REAR ASSEMBLY FOR A THRUSTER, AND ASSOCIATED METHODS

CROSS REFERENCES TO RELATED APPLICATIONS

This application claims priority to French Patent Application No. 1560406, filed Oct. 30, 2015, the entire content of which is incorporated herein by reference in its entirety.

FIELD

The invention relates to an installation for fabricating a thermal protection covering of a thruster body or of a thruster rear assembly, in particular for a solid propellant thruster. The invention also relates to a method of fabricating such a covering and to a method of fabricating a body or a rear assembly for a thruster provided with such a thermal protection covering. The invention relates in particular to fabricating a thermal protection covering of a body or of a rear assembly for a rocket engine.

BACKGROUND

A solid propellant thruster body is essentially made up of a strong shell, e.g. made of composite material, usually provided with an internal thermal protection covering that needs to perform three essential functions: protecting the strong composite shell thermally from attack by the hot gas resulting from combustion of the propellant; attenuating the mechanical stresses generated by the strong shell deforming under pressure during combustion of the propellant; and ensuring that the strong shell is leaktight against leaks of gas.

Various different methods exist for applying thermal protection coverings to the inside of the strong shell of a thruster body. One of them consists in using a rubber prepared by conventional rubber industry means (cylinder mixers, internal mixers, . . . ) in the non-vulcanized semi-manufactured state and of viscous consistency, and in transforming the rubber into elastomer sheets that are to be cut and then draped on a mandrel prior to being vulcanized in an autoclave. The various thermal protection elements as made in this way are then separated from their respective mandrels in order to be assembled on another mandrel (generally made of metal and capable of being dismantled) that is used for making the composite shell by filamentary winding onto the thermal protection as constituted in this way. That method leads to long manufacturing cycles that give that technology a particularly high implementation cost. Specifically, it requires many kinds of tooling and also presents a discontinuous succession of operations, some of which are manual.

Another known type of method serves to reduce implementation costs. It consists in covering a mandrel in a layer of elastomer prior to forming the strong shell of the thruster body by filamentary winding of a composite material. In such a method, the elastomer layer is made by depositing an extruded strip over the entire outside surface of a rotating mandrel. The covering as obtained in that way is then vulcanized in an autoclave prior to performing the filamentary winding. Although such a method serves to simplify the method of making the internal thermal protection covering, the resulting covering does not always present the initially expected properties.

Document WO 2014/118340 discloses an appliance for extruding an elastomer mixture. Document EP 2 060 383 discloses a method of measuring a resin content.

There therefore exists a need to provide an installation for fabricating a thermal protection covering of a body or of a rear assembly for a thruster that enables such a covering to be fabricated in relatively simple and fast manner while ensuring that the covering obtained in this way reliably obtains the expected properties.

SUMMARY

To this end, in a first aspect, the invention provides an installation for fabricating a thermal protection covering of a body or of a rear assembly for a thruster, the installation comprising at least:

an extruder presenting a die having an outlet orifice through which a strip of elastomer material is to be extruded, the extruder being provided with a die control system configured to vary the size of the outlet orifice of the die;

a mandrel configured to be set into rotation about its axis;

a deposition head configured to deposit the strip on the mandrel, the deposition head and the mandrel being configured to be set into movement relative to each other along the longitudinal axis of the mandrel;

a conveyor system configured to convey the strip from the outlet orifice of the die to the deposition head; and a thickness monitoring system configured to measure the thickness of the strip on the deposition head and on the mandrel and to compare each measured thickness value with a predetermined value, the thickness monitoring system also being configured, as a function of the result of such comparisons, to control the die control system so as to cause the size of the outlet orifice of the die to vary.

The inventors have observed that in prior techniques, the thickness of the extruded elastomer strip varies between the moment when the strip is extruded through the outlet orifice of the die and the moment when the strip is deposited on the mandrel. This variation in thickness depends on various parameters (pressure, strip speed, temperature, . . . ) and thus its extent nevertheless remains difficult to anticipate. The fact that the thickness of the extruded strip varies on its path to the deposition zone on the mandrel can, under certain circumstances, lead to dimensional requirements for the thermal protection covering not being complied with, and thus to properties that are sub-optimum. By using the thickness monitoring system in association with the die control system, the invention serves beneficially to adapt the operation of the installation to the extent of variation in the thickness of the extruded strip as observed at the deposition head and on the mandrel. The invention thus makes it possible to accommodate this phenomenon of variation in the thickness of the extruded strip so as to obtain, in relatively simple and reliable manner, a thermal protection covering that presents the expected properties. Specifically, if the thickness monitoring system detects that the thickness of the strip on the deposition head and the thickness of the strip on the mandrel are both greater than the predetermined thickness value, then this monitoring system can apply feedback to the die control system in order to reduce the size of the outlet orifice of the die. Analogously, if the thickness monitoring system detects that the thickness of the strip on the deposition head and the thickness of the strip on the mandrel are both less than the predetermined thickness value, then this monitoring system can apply feedback to the die control system to increase the size of the outlet orifice of the die. Once the thickness monitoring system detects that the strip presents the predetermined thickness, the size of the outlet orifice is kept unchanged until any subsequent deviation in the thickness of the strip is detected.

In an embodiment, the deposition head may comprise an applicator member for applying the strip on the mandrel and the thickness monitoring system may also be configured to act as a function of the result of the thickness comparisons to control the pressure with which the strip is applied against the mandrel, as imposed by the applicator member.

The applicator member imposes an application pressure on the strip while it is being deposited on the mandrel in order to make the strip adhere to the mandrel. Because of the application pressure, the thickness of the strip on the mandrel is less than or equal to the thickness presented by the strip on the deposition head (i.e. immediately before being deposited on the mandrel). An increase in the application pressure thus accentuates the reduction in the thickness of the strip between the deposition head and the mandrel. Consequently, in this embodiment, if the thickness monitoring system detects that the thickness of the strip on the deposition head is greater than or equal to the predetermined value, but that the thickness of the strip on the mandrel is less than the predetermined thickness value, then the monitoring system can apply feedback to the applicator member in order to reduce the application pressure imposed by the applicator member on the strip while it is being deposited on the mandrel. Under such circumstances, the reduction in thickness associated with the application pressure is thus reduced in order to obtain the thickness desired for the strip on the mandrel. In contrast, if the thickness monitoring system detects that the thickness of the strip on the deposition head is greater than the predetermined value, and that the thickness of the strip on the mandrel is also greater than the predetermined thickness, this monitoring system can then apply feedback to the applicator member in order to increase the application pressure imposed by the applicator member on the strip while it is being deposited on the mandrel. Under such circumstances, the thickness reduction associated with the application pressure is thus accentuated in order to obtain the thickness desired for the strip on the mandrel.

The above-described embodiment with a feedback loop from the thickness monitoring system to the applicator member makes it possible beneficially to further improve the accuracy with which thickness is regulated in order to obtain even more reliably the thickness desired for the strip deposited on the mandrel.

In an embodiment, the installation may further comprise a temperature monitoring system configured to measure the temperature of the strip on the deposition head and to compare the measured temperature value with a predetermined temperature value, the installation possibly further comprising a first heater member configured to heat the strip in the die of the extruder, and a second heater member configured to heat the strip on the deposition head, the temperature monitoring system further being configured to act as a function of the result of the comparison to control at least one of the first and second heater members.

This embodiment beneficially makes it possible to have finer control over the temperature of the strip while it is being deposited in order to optimize its adhesion power and improve the adhesion of the strip on the mandrel.

In an embodiment, the deposition head may comprise an applicator member for applying the strip on the mandrel and the installation may also include a strip thickness adapter system for adapting the thickness of the strip and configured to control the die control system in order to increase the size of the outlet orifice following an increase in the pressure with which the strip is applied against the mandrel as imposed by the applicator member.

This embodiment may be beneficial when an operator or an automatic control system detects a defect in the adhesion of the strip after it has been applied against the mandrel. Under such circumstances, the application pressure of the strip can be increased in order to make the strip adhere better to the mandrel. Given that increasing the application pressure leads to a reduction in the thickness of the strip between the deposition head and the mandrel, the thickness adapter system also increases the size of the outlet orifice of the die so as to extrude the strip at a greater thickness, thereby compensating for the thickness reduction associated with increasing the application pressure. This embodiment is thus beneficial for optimizing the adhesion of the strip on the mandrel, but without that modifying the thickness of the strip deposited on the mandrel.

In an embodiment, the installation may further comprise a speed adapter system configured to vary the speed at which the strip is deposited on the mandrel and to reduce, or respectively to increase, the speed of extrusion of the strip through the outlet orifice following a reduction, or respectively an increase, in the deposition speed of the strip on the mandrel.

This embodiment may be beneficial when an operator or an automatic monitoring system detects a defect of adhesion or of positioning of the strip on the mandrel. In order to enable an operator to intervene so as to correct the detected defect, the speed adapter system is actuated to reduce the speed at which the strip is deposited on the mandrel. Simultaneously with this reduction in speed, the speed adapter system controls the extruder so as to reduce the speed with which the strip is extruded through the outlet orifice and thus match the extrusion speed to the new speed at which the strip is deposited on the mandrel. Once the adhesion or positioning defect has been corrected, the speed adapter system is actuated once more, this time to increase the speed with which the strip is deposited, and simultaneously with this speed increase, to increase the speed with which the strip is extruded, in order to match the extrusion speed to the imposed deposition speed.

In an embodiment, the die may be defined by at least two elements that co-operate with each other and that are movable relative to each other, the die control system possibly being configured to move at least one of these elements so as to vary the size of the outlet orifice of the die.

An aspect of the present invention also provides a method of fabricating a thermal protection covering of a body or of a rear assembly for a thruster, the method using an installation as described above and comprising at least the following steps:

extruding the strip of elastomer material through an outlet orifice of the die;

conveying the extruded strip to the deposition head by means of the conveyor system;

using the deposition head to deposit the extruded strip on the mandrel set into rotation about its own axis, the deposition head and the mandrel being set into relative movement along the longitudinal axis of the mandrel during deposition, the thickness of the extruded strip being measured on the deposition head and on the mandrel by the thickness monitoring system;

the thickness monitoring system comparing each measured thickness value with a predetermined thickness value; and as a function of the results of the comparisons performed, the thickness monitoring system controlling the die control system to vary the size of the outlet orifice and extrude the strip at a different thickness.

In an implementation, the temperature monitoring system may measure the temperature of the strip on the deposition head and may compare the measured temperature value with a predetermined temperature value in order to act as a function of the result of the temperature comparison that has been performed to control at least one of the first and second heater members in order to vary the temperature of the strip.

In an implementation, the thickness monitoring system may also act as a function of the results of the thickness comparisons that have been performed to control the applicator member of the deposition head so as to vary the pressure imposed by the applicator member on the strip while it is being deposited on the mandrel.

In an implementation, the pressure applied by the applicator member of the deposition head may be increased while the strip is being deposited on the mandrel with the strip thickness adapter system acting after this increase in pressure to control the die control system so as to increase the size of the outlet orifice and extrude the strip at a greater thickness.

In an implementation, the speed of deposition of the strip on the mandrel may be reduced, or respectively increased, and the speed adapter system may reduce, or respectively increase, the speed of extrusion of the strip through the outlet orifice following this modification in the deposition speed.

In an implementation, the thermal protection covering may comprise a stack of a plurality of layers, each of the layers being formed by the deposition head depositing the extruded strip on the mandrel. It is possible to perform deposition in a plurality of successive passes of the deposition head along the mandrel. In a variant, the thermal protection covering comprises a single layer formed by the deposition head depositing the extruded strip on the mandrel.

The method may also include a step of machining the thermal protection covering so that it has a desired outside profile. A step may also be provided that consists in polymerizing the covering by baking.

An aspect of the present invention also provides a method of fabricating a thruster body comprising at least one strong shell provided with an internal and/or external thermal protection covering, wherein the thermal protection covering is made by performing the method as described above.

An aspect of the present invention also provides a method of fabricating a thruster rear assembly comprising at least a strong shell provided with an external thermal protection covering, wherein the thermal protection covering is made by performing the method as described above.

In an implementation, an internal thermal protection covering of a thruster body may be made on the mandrel, and the strong shell of the thruster body may then be deposited on an outside surface of the thermal protection covering as made in this way and be bonded thereto.

In an implementation, an external thermal protection covering may be made on an outside surface of the strong shell and be bonded thereto.

BRIEF DESCRIPTION OF THE DRAWINGS

Other characteristics and benefits of the invention appear from the following description of particular embodiments of the invention, given as non-limiting examples and with reference to the accompanying drawings, in which.

DETAILED DESCRIPTION

Figure 1:
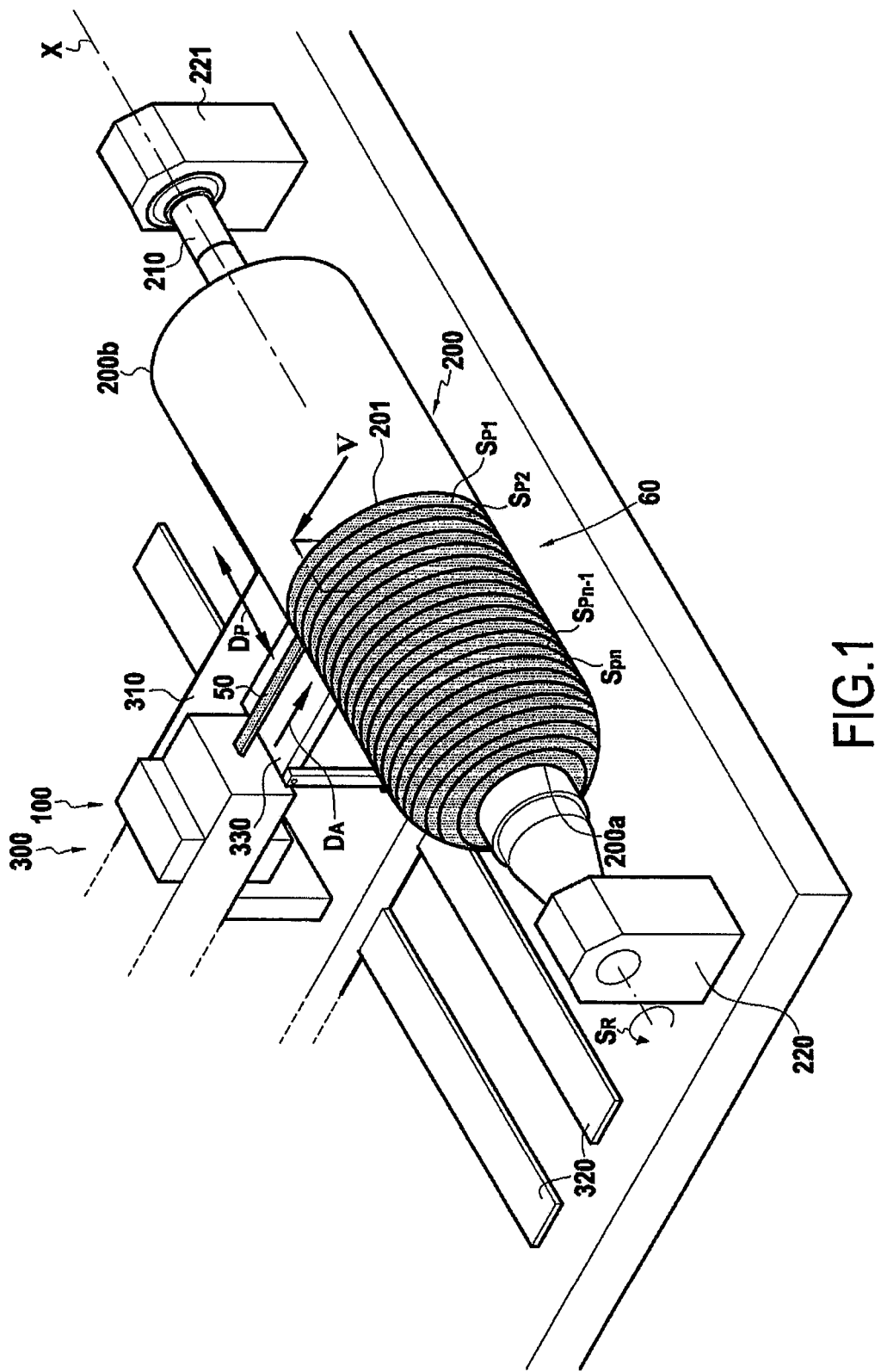
FIG. 1 is a fragmentary diagram of an embodiment of an installation of the invention.

FIG. 1 shows an embodiment of an installation 300 for fabricating a thermal protection covering out of elastomer material of a body or of a rear assembly for a thruster. The installation 300 comprises an extruder device 100 on board a carriage platform 310 and a mandrel 200, e.g. made of metal, mounted on a rotary shaft 210 supported by two headstocks 220 and 221, at least one of which includes a motor (not shown) for driving the mandrel 200 in rotation in the direction indicated by arrow SR in FIG. 1. The installation 300 also has longitudinal rails 320 parallel to the longitudinal axis X of the mandrel 200 and carrying the carriage platform 310, which platform is suitable for moving longitudinally on the rails 320.

Figure 5:
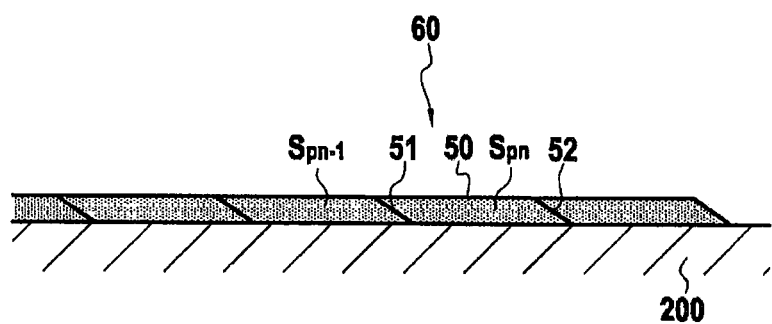
FIG. 5 is a longitudinal section view of a thermal protection covering obtained by performing an implementation of the method of the invention.

A continuous strip of elastomer material 50 extruded by the extruder device 100 is conveyed by a conveyor belt 330 to a deposition head so as to be deposited on the outside surface of the mandrel 200. The strip 50 is deposited by winding touching turns Sp1, Sp2, Spn−1, Spn around the mandrel 200. The winding begins from an intermediate position 201 on the mandrel 200 situated between the first end 200*a* and the second end 200*b* of the mandrel. The winding of the strip 50 is continued until one of the two ends 200*a* and 200*b* of the mandrel 200 is reached, in this example the end 200*a*. Once this first portion of the thermal protection covering has been made, the winding of the strip 50 is re-started from the intermediate position 201 and continued until reaching the other end of the mandrel, in this example the end 200*b*, in order to make the second portion of the thermal protection covering (not shown in FIG. 1) so as to finalize the fabrication of the covering on the entire mandrel 200. This produces a continuous thermal protection covering 60 as shown in FIG. 5. As winding progresses, the carriage platform 310 moves along the longitudinal axis X of the mandrel 200 in one or the other of the two directions indicated by double arrow DP in FIG. 1.

The covering that is formed may comprise a single layer. In a variant, the covering may comprise a stack of a plurality of layers.

Figure 2:
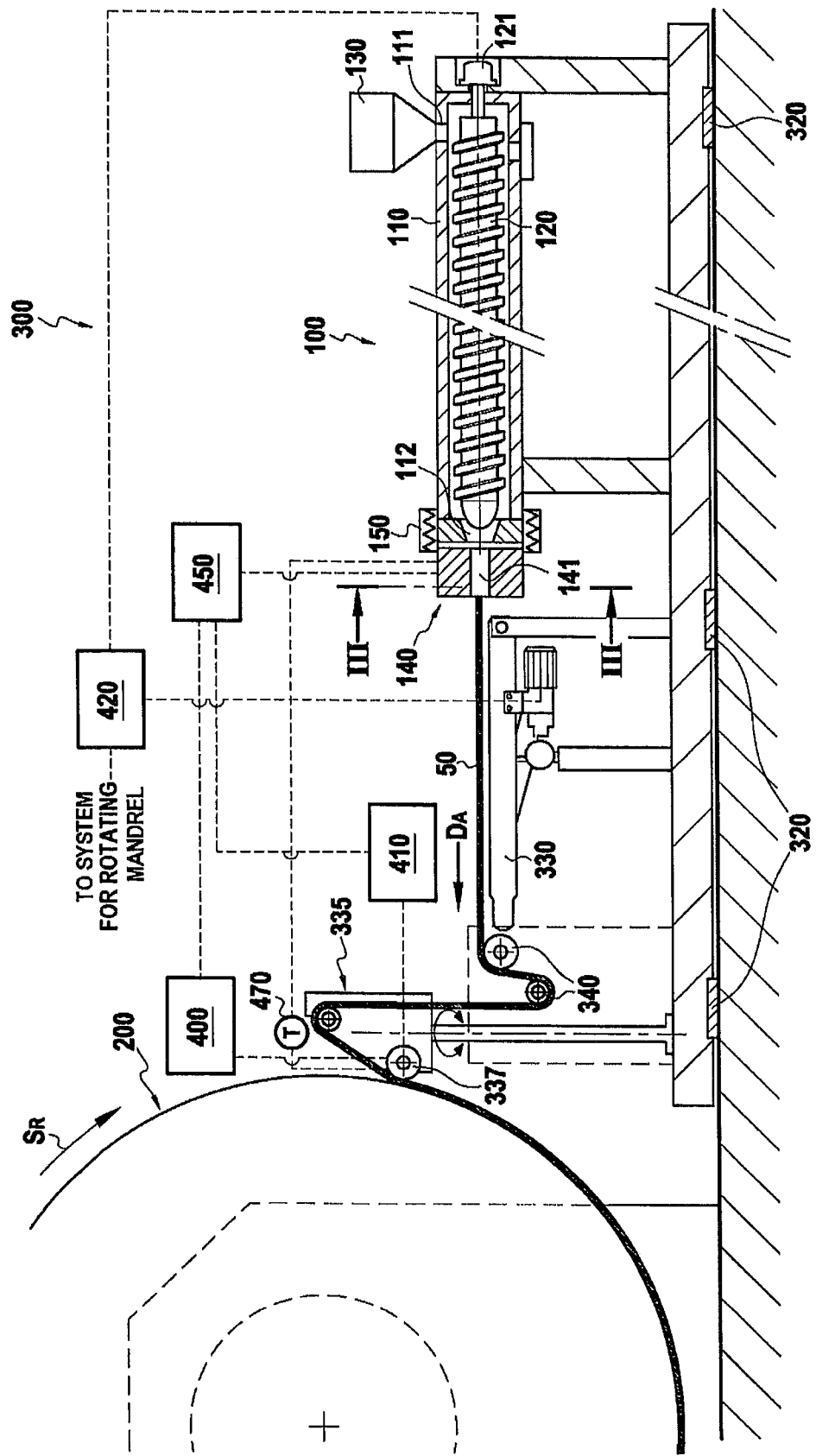
FIG. 2 is a cross-section view perpendicular to the longitudinal axis of the mandrel of the FIG. 1 installation.
Figure 3:
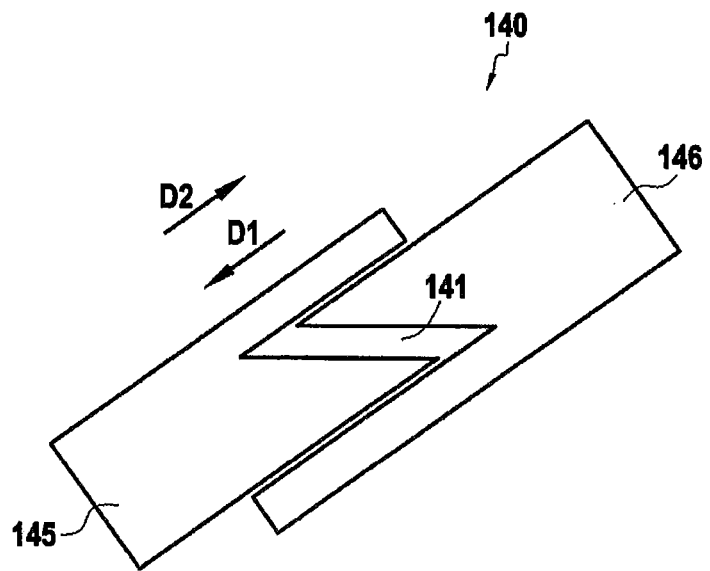
FIG. 3 is a diagrammatic and fragmentary view of the extruder die in section on III-III.

In FIG. 2, the extruder device 100 is shown in greater detail. The device 100 comprises in conventional manner a body 110 containing a wormscrew 120 driven in rotation by a motor 121, a feed hopper 130 in communication with the inlet 111 of the body 110, and an extruder die 140 in communication with the outlet 112 of the body 110, the die being mounted on the body 110 by means of an extruder head 150. The ingredient(s) making up the strip 50 are introduced into the body 110 via the feed hopper in the form of granules or powder. The strip of elastomer material 50 may be obtained from an ethylene propylene diene monomer (EPDM) elastomer material. The wormscrew 120 plasticates, compresses, shears, heats, and transports the fluidified material continuously towards the extruder die 140 that imparts the desired shape to the fluidified material. By way of example, as shown in FIG. 3, the extruder die 140 may have an outlet orifice 141 in the form of a non-rectangular parallelogram. It would not go beyond the ambit of the invention for the outlet orifice to be of some other shape, such as a rectangular shape, e.g. a square shape. In the example shown in FIG. 3, the extruder die is defined by two elements 145 and 146 that co-operate with each other and that are movable relative to each other in order to vary the size of the outlet orifice 141 of the die 140, as described in greater detail below.

The body 110 is provided with a system configured to regulate the temperature inside it (not shown) in order to control the state of the fluidified material. After being extruded by the die 140, the strip 50 is transported in an advance direction DA to guide rollers 340 and then to the deposition head 335. The strip 50 is then wound automatically on the mandrel 200 using the deposition head 335, which takes up a position so as to be parallel to the local plane of deposition on the mandrel. The deposition head 335 comprises an applicator member 337 for applying the strip 50 on the mandrel 200. This applicator member 337 is for applying an application pressure on the strip 50 so as to cause it to adhere correctly to the mandrel 200. By way of example, the applicator member 337 may be in the form of a compactor wheel.

The installation 300 also has a thickness monitoring system 400 configured to measure the thickness of the strip 50 on the deposition head 335 and on the mandrel 200. The monitoring system 400 comprises a conventional device for measuring thickness without making contact, e.g. as sold under the reference AT20E-PM111 by the supplier SICK. The thickness monitoring system 400 is also provided with a processor enabling each measured thickness value to be compared with a predetermined value. The thickness monitoring system 400 is configured to transmit information associated with the result of this comparison to the die control system 450 that serves to vary the size of the outlet orifice 141 of the die 140. In the example die of FIG. 3, the die control system 450 serves to actuate a mechanical system (not shown) serving to cause one of the elements 145 or 146 to slide relative to the other element 146 or 145 along directions indicated by arrows D1 and D2. Moving the elements 145 and 146 relative to each other causes the size of the outlet orifice 141 of the die 140 to be modified. Once the size desired for the outlet orifice has been reached, the control system 140 actuates a blocking system (not shown) serving to block the elements 145 and 146 in position. The thickness monitoring system 400 is also configured to transmit information associated with the result of thickness comparisons performed at the applicator member 337 of the deposition head 335. The regulation performed by the thickness monitoring system 400 is described in greater detail below.

As shown in FIG. 2, the installation may also include a temperature monitoring system 470 configured to measure the temperature of the strip 50 on the deposition head 335 and to compare the measured temperature value with a predetermined temperature value. Such a temperature monitoring system 470 includes at least one temperature sensor together with the processor for comparing temperatures. By way of example, it is possible to use a temperature sensor sold under the reference OMEGA OS136. The temperature monitoring system 470 is configured to control a first heater member (not shown) configured to heat the strip 50 in the die 140 of the extruder 100 and a second heater member (not shown) present at the deposition head 335. The regulation performed by the temperature monitoring system 470 is described in greater detail below.

The installation 300 also includes a thickness adapter system 410 for adapting the thickness of the strip 50 and configured to control the die control system 450 to increase the size of the outlet orifice 141 in response to an increase in the pressure with which the strip 50 is applied to the mandrel 200 as imposed by the applicator member 337. As explained above, the presence of the thickness adapter system 410 makes it possible to compensate for the reduction in thickness associated with an increase in the application pressure that is applied in order to improve the adhesion of the strip 50 on the mandrel 200.

The installation 300 also has a speed adapter system 420 configured to vary the speed at which the strip 50 is deposited on the mandrel, and thus the speed of rotation of the mandrel 200, and in order to adapt the speed at which the strip 50 is extruded and the speed at which the strip is conveyed on the conveyor belt 330 to the imposed speed at which the strip 50 is deposited. As explained above, the presence of the speed adapter system 420 is beneficial in order to enable a maintenance operation to be performed when an adhesion or positioning defect of the strip is detected. The installation 300 also includes a position monitoring system (not shown) for monitoring the position of the strip 50 on the mandrel 200 in order to control how adjacent turns fit together. These systems are themselves known, and by way of example it is possible for this purpose to use a device sold under the reference AT20E-PM111 by the supplier SICK.

The regulation as performed by the thickness adapter system 410 and the regulation performed by the speed adapter system 420 are described below.

Figure 4A:
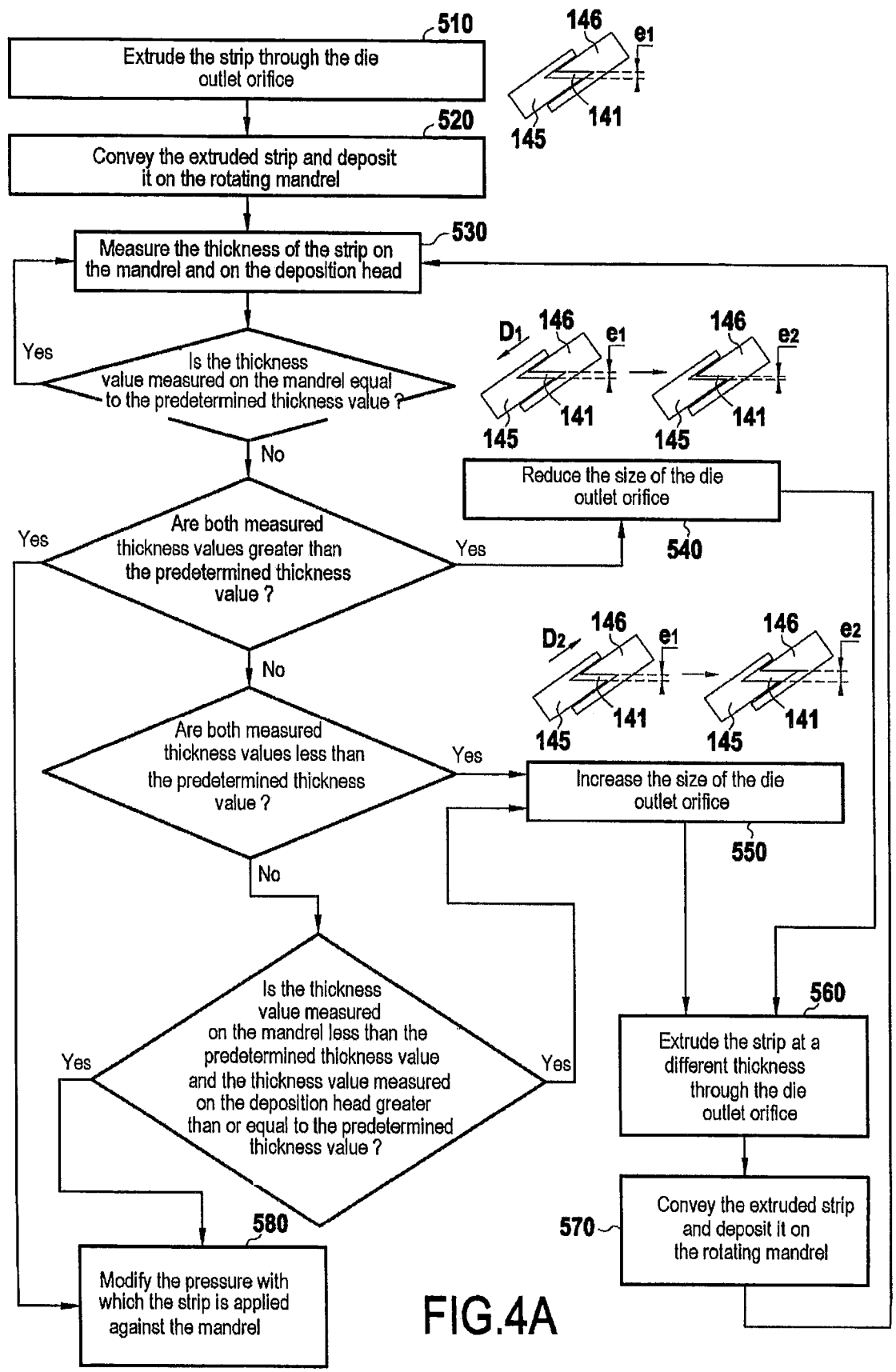
FIG. 4A is a flow chart showing the regulation performed by the thickness monitoring system in the context of a method of an embodiment of the invention.

The way in which the thickness monitoring system 400 operates is shown diagrammatically by means of the flow chart of FIG. 4A. The method of fabricating the thermal protection covering begins with the strip 50 being extruded at a first thickness $e_1$ through the outlet orifice 141 (step 500). The strip 50 as extruded in this way at the first thickness $e_1$ is then taken to the deposition head 335 by the conveyor belt 330, and then the strip 50 is deposited by the deposition head 335 on the mandrel 200 that is set into rotation about its own axis (step 520). During deposition, the deposition head 335, the conveyor belt 330, and the extruder 100 are moved in translation as a unit along the longitudinal axis of the mandrel X by moving the carriage platform 310 along the longitudinal rails 320. The thickness of the strip 50 extruded at the first thickness $e_1$ is measured on the deposition head 335 and on the mandrel 200 by the thickness monitoring system 400 (step 530). The monitoring system 400 then compares the thickness measured on the mandrel with a predetermined thickness value. If the thickness of the deposited strip 50 is equal to the predetermined thickness, no information is transmitted to the control system 450 by the monitoring system 400, and the monitoring system 400 continues to measure the thickness of the strip 50 on the mandrel 200 and on the deposition head (step 530) in order to detect any possible subsequent deviation in the thickness of the deposited strip. In the event of the monitoring system 400 detecting that the thickness of the strip 50 on the mandrel 200 is not equal to the predetermined thickness value, then several actions are possible. If the thickness monitoring system detects that the thickness of the strip on the deposition head 335 and the thickness of the strip on the mandrel 200 are both greater than the predetermined thickness value, then the monitoring system 400 can actuate the die control system 450 in order to reduce the size of the outlet orifice 141 of the die so as to extrude the strip at a smaller thickness (step 540). In the example shown, this step causes the element 146 to slide along the element 145 in the direction D1. Still in the situation in which the thicknesses measured on the deposition head 335 and on the mandrel 200 are both greater than the predetermined value, the monitoring system 400 may, as an alternative or in combination, actuate the applicator member 337 in order to compact the strip harder while it is being deposited on the mandrel, thereby obtaining the thickness desired for the strip on the mandrel (step 580). In the event of the thickness monitoring system 400 detecting that the thickness of the strip on the deposition head 335 and the thickness of the strip on the mandrel 200 are both smaller than the predetermined thickness value, then the monitoring system 400 applies feedback to the die control system in order to increase the size of the outlet orifice of the die so as to extrude the strip at a greater thickness (step 550). In the example shown, this step leads to the element 146 sliding along the element 145 in the direction D2. If the thickness monitoring system 400 detects that the thickness of the strip on the deposition head is greater than or equal to the predetermined value, but that the thickness of the strip on the mandrel is less than the predetermined value, then the monitoring system 400 may apply feedback to the applicator member 337 to diminish the application pressure imposed by the applicator member 337 on the strip while it is being deposited on the mandrel (step 580). Under such circumstances, in a variant or in combination, the thickness monitoring system 400 may cause the size of the outlet orifice of the die to be increased (step 550).

Changing the size of the outlet orifice 141 enables the strip 50 to be extruded through the outlet orifice 141 at a second thickness $e_2$ different from the first thickness (step 560). The strip extruded at the second thickness is then conveyed by the conveyor belt 330 to the deposition head 335 in order to be deposited on the mandrel (step 570). While the strip extruded at the second thickness is being deposited, the monitoring system 400 continues to measure the thickness of the strip on the mandrel and on the deposition head in order to continue to adjust the size of the outlet orifice 141 (step 530), where necessary. When the die control system changes the size of the outlet orifice of the die, and thus the thickness of the extruded strip, the temperature imposed in the die of the extruder and/or the speed of extrusion of the strip may be adjusted in order to maintain the temperature of the strip at a value that is substantially constant.

Figure 4B:
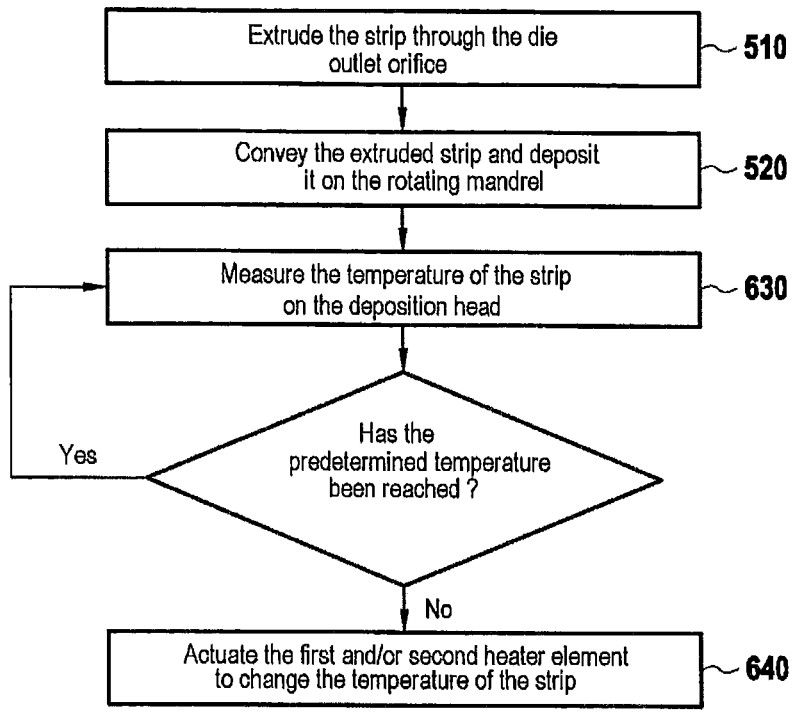
FIG. 4B is a flow chart showing the regulation performed by the temperature monitoring system in the context of a method of an embodiment of the invention.

The way in which the temperature monitoring system 470 operates is shown diagrammatically by means of the flow chart of FIG. 4B. The temperature of the strip is measured at the deposition head 335 by the monitoring system 470 (step 630). If the measured temperature value corresponds to the predetermined temperature, the monitoring system 470 does not modify the heating parameters and it continues to measure the temperature of the strip in order to detect any subsequent deviation of the temperature. In contrast, if the measured temperature value is different from the predetermined temperature value, then the temperature monitoring system 470 acts on the first and/or the second heater member in order to vary the temperature of the strip. If the temperature monitoring system 470 detects a significant difference between the measured strip temperature and the desired strip temperature, it may be preferable for the temperature monitoring system to act on the first heater member and possibly also on the second heater member. In contrast, if the difference is relatively small, it may suffice for the temperature monitoring system to act solely on the second heater member. As mentioned above, using the temperature monitoring system serves to optimize adhesion of the strip on the mandrel. Taking an action on the first heater member may be accompanied by modifying the size of the outlet orifice of the die and thus the thickness of the extruded strip and/or modifying the speed of extrusion and possibly modifying the pressure with which the strip is applied in order to optimize the resulting temperature regulation.

Figure 4C:
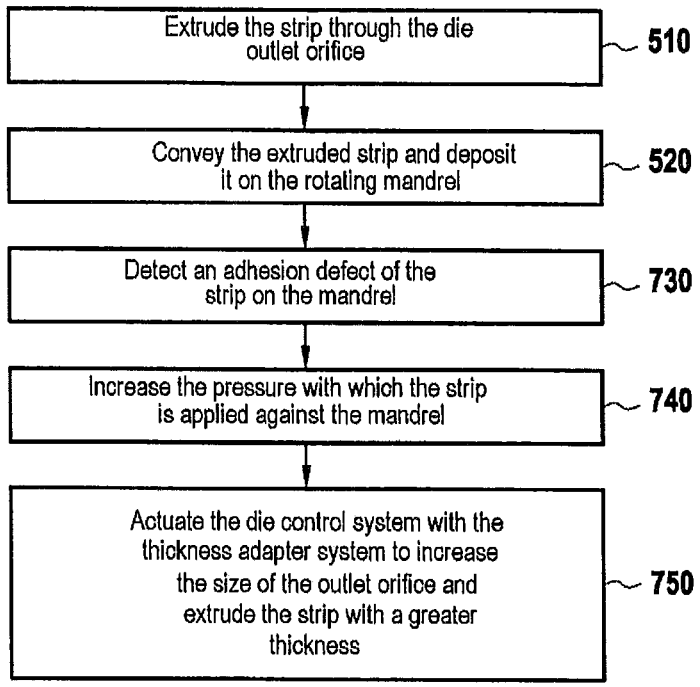
FIG. 4C is a flow chart showing the regulation performed by the thickness adapter system in the context of a method of an embodiment of the invention.

The way in which the thickness adapter system 410 operates is shown diagrammatically by means of the flow chart of FIG. 4C. When an adhesion defect of the strip on the mandrel is detected (step 730), the applicator member may be operated to exert greater application pressure on the strip so as to improve its adhesion on the mandrel (step 740). Under such circumstances, the thickness adapter system 410 acts on the die control system in order to increase the size of the outlet orifice and extrude the strip at a greater thickness (step 750). When the size of the outlet orifice of the die, and thus the thickness of the extruded strip, is modified by acting on the thickness adapter system, the temperature imposed in the die of the extruder and/or the speed at which the strip is extruded may be adjusted so as to maintain the temperature of the strip at a value that is substantially constant.

Figure 4D:
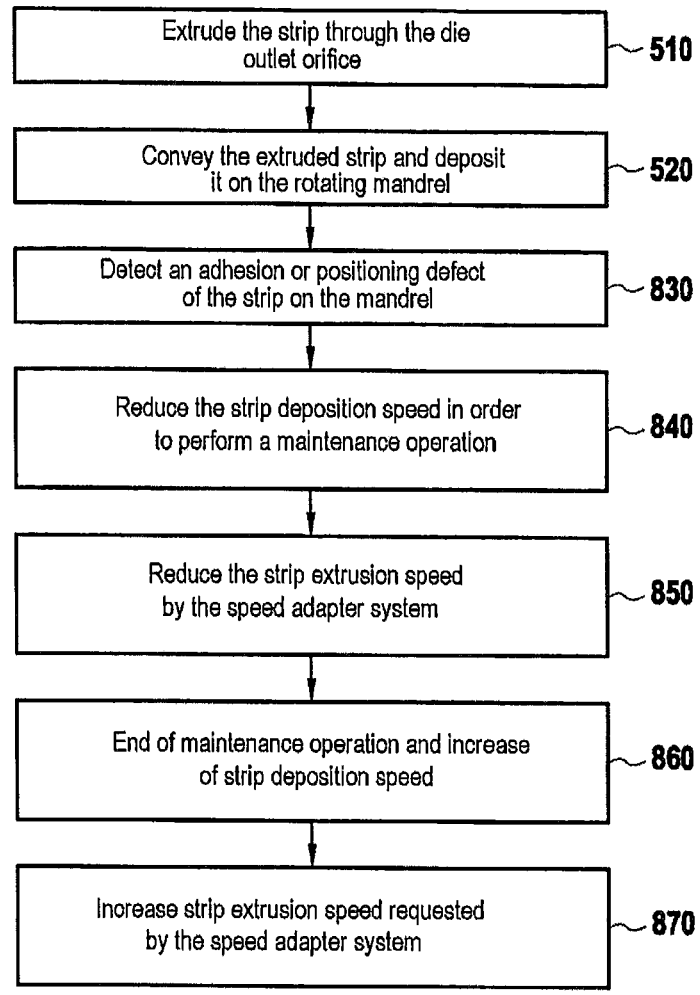
FIG. 4D is a flow chart showing the regulation performed by the speed adapter system in the context of a method of an embodiment of the invention.

The way in which the speed adapter system 420 operates is shown diagrammatically by means of the flow chart of FIG. 4D. When it is detected that the strip is poorly positioned or is adhering poorly to the mandrel, the speed adapter system is actuated in order to reduce the speed of rotation of the die and thus deduce the deposition speed of the strip (step 840). This reduction in the deposition speed enables an operator to perform a maintenance operation in order to correct the detected defect. Simultaneously with this reduction in the deposition speed, the speed adapter system adapts the extrusion speed and the speed of the conveyor belt (step 850). Once the maintenance operation has been performed, the speed adapter system is actuated once more in order to increase the deposition speed of the strip (step 860). Simultaneously with this increase in the deposition speed, the speed adapter system increases the speed at which the strip is extruded and the speed of the conveyor belt (step 870). When the extrusion speed of the strip is modified, the temperature imposed in the die of the extruder and/or the size of the outlet orifice and possibly the application pressure may be adjusted in such a manner as to maintain the temperature and the thickness of the strip at values that are substantially constant.

FIG. 5 is a longitudinal section view showing an example of a thermal protection covering that can be obtained in the context of the invention. The strip 50 extruded by the example die shown in FIG. 3 serves to form touching turns such that, even when they overlap in part so as to provide continuity in the thermal protection covering 60 as formed in this way, they do not lead to any significant variation of thickness at the surface of the covering. This beneficial positioning of touching turns is shown in FIG. 5, which shows that, because of its cross-section in the shape of a non-rectangular parallelogram, the strip 50 has two edges 51 and 52, each forming a chamfer. Thus, one turn, e.g. the turn Spn of the strip 50, can be deposited so as to touch the previously deposited turn, specifically the turn Spn−1, without any significant local increase in the thickness of the covering 60. Nevertheless, it would not go beyond the ambit of the invention for the strip to have some other cross-section, such as a rectangular section for example, and for the covering that is formed to present zones of greater thickness where the edges of the turns are in contact.

Once the thermal protection covering has been deposited, it is possible to polymerize the covering by baking. The baking of the covering may take place at ambient pressure in an autoclave. It serves to give good mechanical and thermal properties to the covering.

There follows a description of how a thruster body having a strong shell provided with an internal or external thermal protection covering can be fabricated.

In an implementation, the strong shell of the thruster body may be deposited on the outside surface of a thermal protection covering already deposited on the mandrel by performing the above-described method. A strong shell of composite material may be made on the outside surface by winding filaments of a preimpregnated fiber material (e.g. winding a carbon, glass, or polyaramide yarn that is impregnated with a non-polymerized thermosetting resin). Thereafter, it may be beneficial to polymerize the covering simultaneously with polymerizing the filamentary winding so as to obtain the thruster body provided with an internal thermal protection covering.

The method of the invention may also be applied to making a thruster body having an external thermal protection covering. Under such circumstances, the preimpregnated fiber material that is to form the strong shell of composite material is initially deposited by filamentary winding on the mandrel. Thereafter, the external thermal protection covering is made by performing the above-described method. The filamentary winding and the external thermal protection covering that have been deposited can then be polymerized simultaneously in order to obtain the thruster body having an external thermal protection covering.

Figure 6:
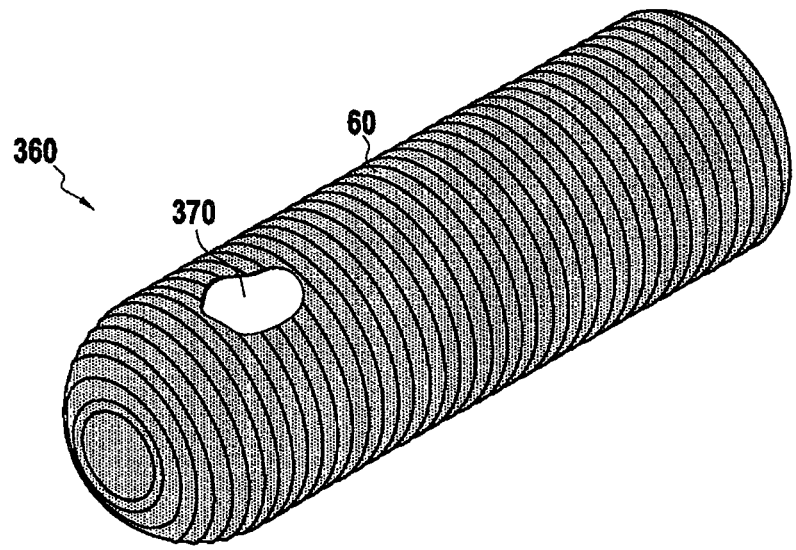
FIG. 6 shows a thruster body comprising a structural shell provided with an external thermal protection covering obtained by performing a method of an embodiment of the invention.

FIG. 6 shows a thruster body 360 having a structural shell 370 with an external thermal protection covering 60 formed by performing a method as described above. It would not go beyond the ambit of the invention for the thruster body to comprise a structural shell provided with an internal thermal protection covering formed by performing a method as described above.

Figure 7:
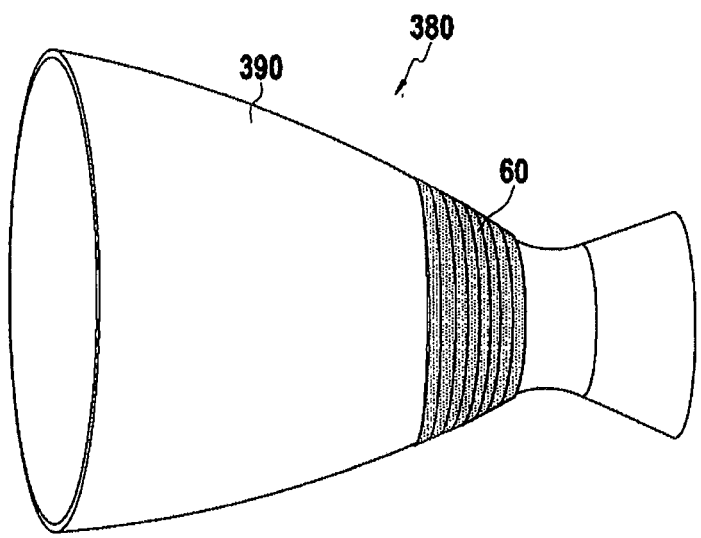
FIG. 7 shows a thruster rear assembly provided with an external thermal protection covering obtained by performing a method of an embodiment of the invention.

The invention is not limited to making a thermal protection covering on a thruster body. It may be used for forming a thermal protection covering on a thruster rear assembly such as a nozzle 380 as shown in FIG. 7, which includes an external thermal protection covering 60 over the upper portion of its diverging portion 390, with the covering being made in accordance with an embodiment of the method of the invention.

The invention claimed is:

1. An installation for fabricating a thermal protection covering of a body or of a rear assembly for a thruster, said installation comprising:
    an extruder including a die having an outlet orifice through which a strip of elastomer material is to be extruded, the extruder being provided with a die control system configured to vary a size of the outlet orifice of the die;
    a mandrel configured to be set into rotation about its axis;
    a deposition head configured to deposit the strip of elastomer material on the mandrel, the deposition head and the mandrel being configured to be set into movement relative to each other along a longitudinal axis of the mandrel;
    a conveyor system configured to convey the strip from the outlet orifice of the die to the deposition head; and
    a thickness monitoring system configured to measure a first value of a thickness of the strip on the deposition head and configured to measure a second value of the thickness of the strip that has been deposited on the mandrel, the thickness monitoring system further including a processor to compare each of the first and second thickness values with a predetermined value to provide first and second comparison values, said thickness monitoring system also being configured, as a function of results of the comparisons of each of the first and second thickness values with the predetermined value that provide the first and second comparison values, to control the die control system so as to cause the size of the outlet orifice of the die to vary.

2. The installation according to claim 1, further comprising a temperature monitoring system configured to measure a temperature of the strip on the deposition head and to compare a measured temperature value with a predetermined temperature value, the installation further comprising a first heater member configured to heat the strip in the die of the extruder, and a second heater member configured to heat the strip on the deposition head, the temperature monitoring system further being configured to act as a function of the result of the comparison between said measured temperature value and said predetermined temperature value to control at least one of the first and second heater members.

3. The installation according to claim 1, wherein the deposition head comprises an applicator member for applying the strip on the mandrel, and the thickness monitoring system being further configured, as a function of the result of the thickness comparisons, to control an application pressure of the strip against the mandrel as imposed by the applicator member.

4. The installation according to claim 1, wherein the deposition head comprises an applicator member for applying the strip on the mandrel and the installation further comprising a strip thickness adapter system for adapting the thickness of the strip and configured to control the die control system so as to increase the size of the outlet orifice following an increase in an application pressure of the strip against the mandrel as imposed by the applicator member.

5. The installation according to claim 1, further comprising a speed adapter system configured to vary a speed at which the strip is deposited on the mandrel and to reduce, or respectively to increase, a speed of extrusion of the strip through the outlet orifice following a reduction, or respectively an increase, in the deposition speed of the strip on the mandrel.

6. The installation according to claim 1, wherein the die is defined by at least two elements that co-operate with each other and that are movable relative to each other, the die control system being configured to move at least one of these elements so as to vary the size of the outlet orifice of the die.

\* \* \* \* \*